United States Patent [19]

Kobayashi

[11] Patent Number: 5,258,970
[45] Date of Patent: Nov. 2, 1993

[54] OPTICAL DISC AND OPTICAL DISC REPRODUCING APPARATUS

[75] Inventor: Seiji Kobayashi, Kanagawa, Japan
[73] Assignee: Sony Corporation, Tokyo, Japan
[21] Appl. No.: 861,917
[22] Filed: Apr. 1, 1992
[30] Foreign Application Priority Data Apr. 2, 1991 [JP] Japan .................................. 3-096446

[51] Int. Cl.⁵ ............................ G11B 7/00; G11B 7/26
[52] U.S. Cl. .................................... 369/109; 369/110; 369/275.4; 369/44.42
[58] Field of Search ...................... 369/272, 275.4, 109, 369/110, 120, 131, 44.41, 44.42

[56] References Cited

U.S. PATENT DOCUMENTS 5,140,577  8/1992  Ohsato ............................ 369/44.41

FOREIGN PATENT DOCUMENTS 1-184726  10/1989  Japan .

Primary Examiner—Paul M. Dzierzynski
Assistant Examiner—Don Wong
Attorney, Agent, or Firm—Philip M. Shaw, Jr.

[57] ABSTRACT

A plurality of tracks comprising pits each having a diameter smaller than a beam spot diameter of a laser beam are arranged on an optical disc. By irradiating the laser beam onto the optical disc, a plurality of pits are reproduced a lump. The reflected lights from a plurality of pits on the optical disc are supplied to a plural-divided photodetector. Outputs of the plural-divided photodetector are supplied to a matrix circuit and multi-dimensional vectors are formed. The data recorded on the optical disc is decoded from the multidimensional vectors. A tracking area and a clock area are provided on the optical disc. A tracking control is performed by using a reproduction signal of the tracking area. The clocks are reproduced by using a reproduction signal of the clock area.

16 Claims, 5 Drawing Sheets

OPTICAL DISC AND OPTICAL DISC REPRODUCING APPARATUS

BACKGROUND OF THE INVENTION

1. Field of the Invention

The invention relates to an optical disc and an optical disc reproducing apparatus in which a recording density is improved.

2. Description of the Prior Art

An optical disc such as a compact disc or the like is widely spread as a recording medium which can record a large quality of data. However, in the optical disc which is at present widespread, there is a limitation in a data recording capacity. It is presumed in future that a large amount of data such as image data or the like is recorded onto the optical disc. For preparation of such a case, the development of the optical disc which can realize a higher density and a larger capacity than those of the present optical disc is being progressed.

As a recording method of the optical disc, there are bit-by-bit method and a holographic method. According to the bit-by-bit method, a laser beam is converged to a small diameter and irradiated to pits one by one, thereby reproducing data one bit by one. Almost of the optical discs which are at present put into practical use use the bit-by-bit method. In the bit-by-bit method, a structure is simple and a process such as reproduction of clocks or the like can be easily performed. To raise a recording density in the bit-by-bit method, the pit diameter is reduced and the laser beam is converged until the pit of the small diameter can be reproduced.

A degree of the reduction of the diameter of the pit which is formed onto the optical disc depends on the advancement of the working technique. If the working technique is further progressed in future, the size of pit which can be formed on the optical disc can be further reduced than the present size. Since the spot diameter of the laser beam which can be converged, however, depends on a numerical aperture NA of the lens and a wavelength λ of the laser beam, there is a limitation. According to the bit-by-bit method, therefore, the recording density is limited by the spot size of the laser beam and there is a limitation in the improvement of the recording density.

According to the holographic method, however, the recording density is not limited by the spot size of the laser beam. However, in the holographic method, it is difficult to reproduce the clocks and a reproduction signal is multi-dimensional and signal processes are difficult.

OBJECTS AND SUMMARY OF THE INVENTION

It is, therefore, an object of the invention to provide an optical disc and an optical disc reproducing apparatus in which a high density of the optical disc can be realized and such a high density optical disc can be reproduced.

Another object of the invention is to provide an optical disc and a disc reproducing apparatus which can easily execute a tracking control and a reproduction of clocks.

According to the invention, there is provided a disc reproducing apparatus in which pits of diameters smaller than a diameter of beam spot of a laser beam are arranged on an optical disc, the laser beam is irradiated to a plurality of pits on the optical disc, the reflected lights from a plurality of pits of the optical disc are supplied to a plural-divided photodetector, outputs of the plural-divided photodetector are supplied to a matrix circuit, a multidimensional signal is formed by the matrix circuit, and data recorded on the optical disc is decoded from the multidimensional signal.

According to the invention, the pits of a predetermined pattern are recorded at a predetermined period on the optical disc and the pits of the predetermined pattern are detected, thereby setting a decoding timing.

The above, and other, objects, features and advantages of the present invention will become readily apparent from the following detailed description thereof which is to be read in connection with the accompanying drawings.

DETAILED DESCRIPTION OF THE PREFERRED EMBODIMENTS

Figure 1:
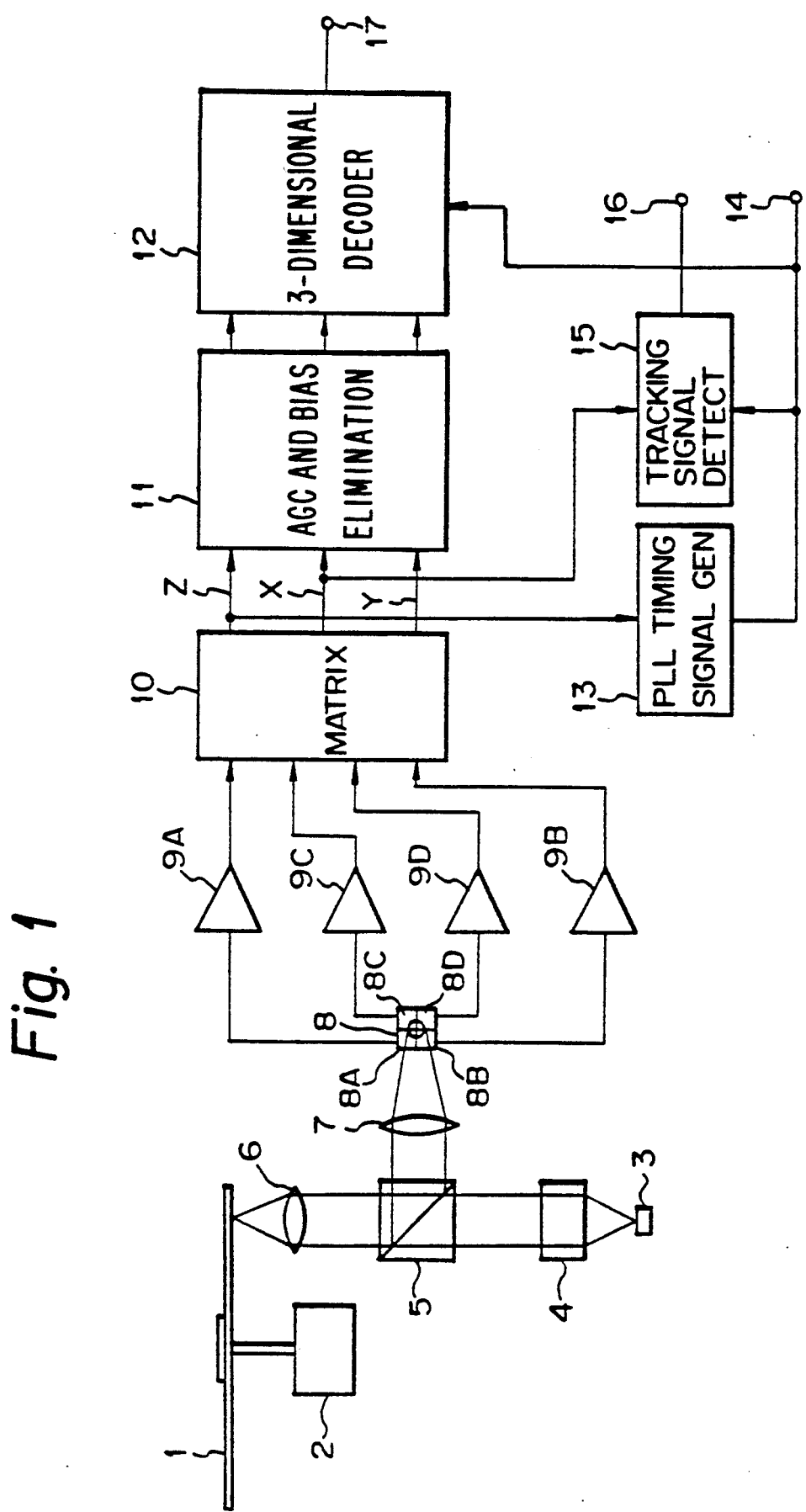
FIG. 1 is a block diagram of an embodiment of the invention.

An embodiment of the invention will be described hereinbelow with reference to the drawings. FIG. 1 shows an embodiment of the invention.

According to an embodiment of the invention, pits of diameters smaller than a beam spot of a laser beam are arranged on an optical disc 1. When the laser beam is irradiated onto the optical disc 1, since the pit diameter is smaller than the beam spot diameter, the reflected lights from a plurality of pits on the optical disc 1 are simultaneously obtained. The reflected lights from a plurality of pits on the optical disc 1 are supplied to a 4-divided photodetector 8 and divided into signals of four areas. Outputs of the 4-divided photodetector 8 are supplied to a matrix circuit 10. Three-dimensional signals are formed from the outputs of the 4-divided photodetector 8 by the matrix circuit 10. Data recorded on the optical disc 1 is decoded from the 3-dimensional signals.

Figure 2:
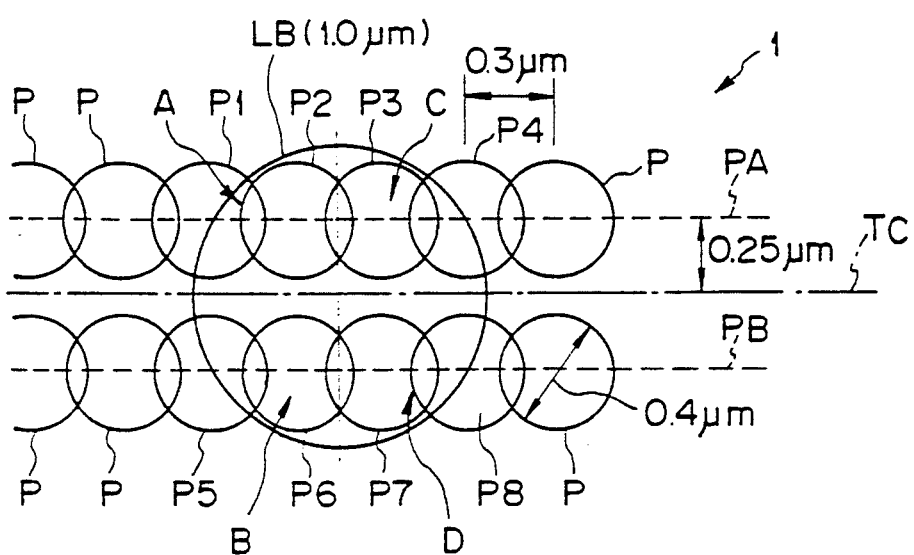
FIG. 2 is a schematic diagram which is used to explain the reproducing principle of the invention.

That is, in FIG. 2, a pit train PA and a pit train PB are formed on the optical disc 1 so as to be away from each other by only an equal distance (for example, 0.25 μm) from a track center TC as a center. Pits P, P, P, ... of diameters smaller than a diameter of beam spot are arranged in each of the pit trains PA and PB. A diameter of each pit P is equal to, for instance, 0.4 μm. A channel clock width is set to, e.g., 0.3 μm. The laser beam is irradiated to the optical disc 1 on which the pits P, P, P, ... of such small diameters are arranged, while setting the track center TC as a center. A diameter of beam spot LB of the laser beam at that time is set to, e.g., 1.0 μm.

In the above case, since the diameter (0.4 μm) of pits P is smaller than the spot diameter (1.0 μm) of the beam spot LB of the laser beam, eight pits P1, P2, P3, ..., P8 are reproduced in a lump as shown in FIG. 2. Reproduction signals of the eight pits P1 to P8 are supplied to the 4-divided photodetector. Outputs of areas A, B, C, and D among the reflected lights of the laser beam are obtained from the 4-divided photodetector.

Three-dimensional signals X, Y, and Z of the primary diffracted light in the radial direction, the primary diffracted light in the tangential direction, and the 0th-order diffracted light are formed from the outputs of the areas A, B, and C. That is, assuming that the outputs of the areas A to D are set to $S_A$, $S_B$, $S_C$, and $S_D$, respectively, the three-dimensional signals X, Y, and Z are obtained as follows.

$$X = (S_A + S_C) - (S_B + S_D) \quad (1)$$

$$Y = (S_A + S_B) - (S_C + S_D) \quad (2)$$

$$Z = S_A + S_B + S_C + S_D \quad (3)$$

Figure 3:
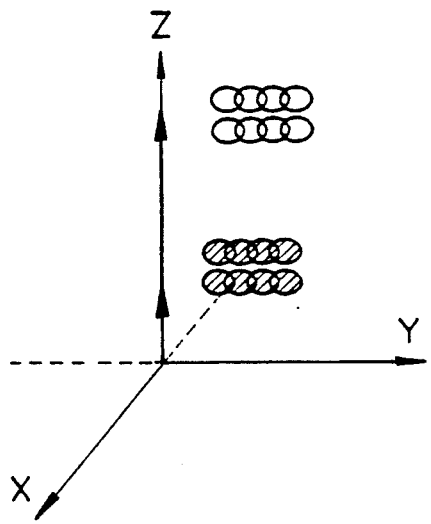
FIG. 3 is a vector diagram which is used to explain the reproducing principle of the invention.
Figure 4:
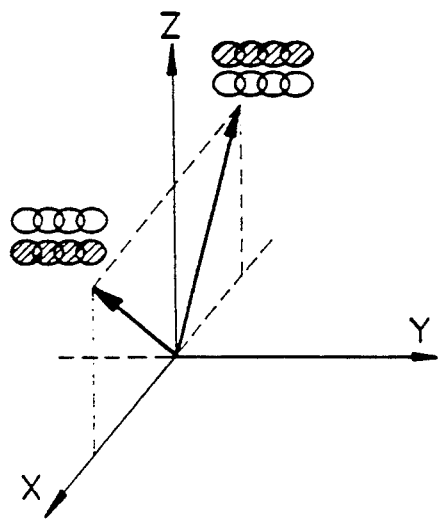
FIG. 4 is a vector diagram which is used to explain the reproducing principle of the invention.
Figure 5:
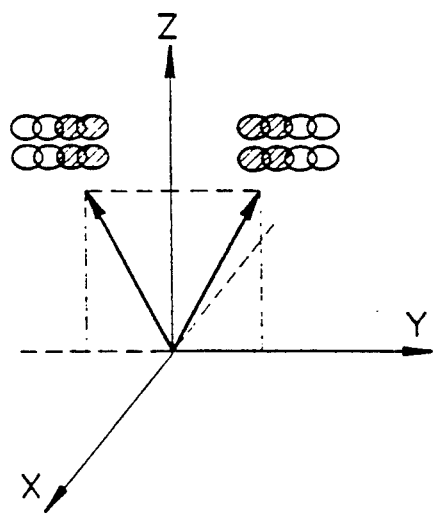
FIG. 5 is a vector diagram which is used to explain the reproducing principle of the invention.

The three-dimensional signals obtained as mentioned above have features according to the pit pattern of eight pits P1 to P8 as shown in vector diagrams of FIGS. 3 to 5. For instance, in the case where all of the eight pits P1 to P8 are equal to "1" or the case where all of the eight pits P1 to P8 are equal to "0", as shown in FIG. 3, only the component in the Z axis direction appears. In the case where all of the pits P1 to P4 are equal to "1" and all of the pits P5 to P8 are equal to "0" or the case where all of the pits P1 to P4 are equal to "0" and all of the pits P5 to P8 are equal to "1", as shown in FIG. 4, a component in the Y axis direction does not appear. In the case where all of the pits P1, P2, P5, and P6 are equal to "1", and all of the pits P3, P4, P7, and P8 are equal to "0" or the case where all of the pits P1, P2, P5, and P6 are equal to "0", and all of the pits P3, P4, P7, and P8 are equal to "1", as shown in FIG. 5, a component in the X axis direction does not appear.

From the above description, by forming the 3dimensional signals from the divided areas A, B, C, and D of the 4-divided photodetector and by judging to which vector the 3-dimensional signal corresponds, the data can be decoded. However, there is a case where the 3-dimensional signals obtained from the outputs of the areas A to D of the 4-divided photodetector are actually influenced by the noises and do not coincide with the vectors of the pit pattern corresponding to those outputs. According to the embodiment of the invention, therefore, a pattern whose vectors are away from each other by predetermined distances or more is preliminarily selected as a recording pit pattern and the nearest vector in the 3-dimensional signals derived from the outputs of the area A to D of the 4-divided photodetector is selected.

A practical construction of the optical disc reproducing apparatus for reproducing data on the basis of the above principle will now be described hereinbelow.

Figure 6:
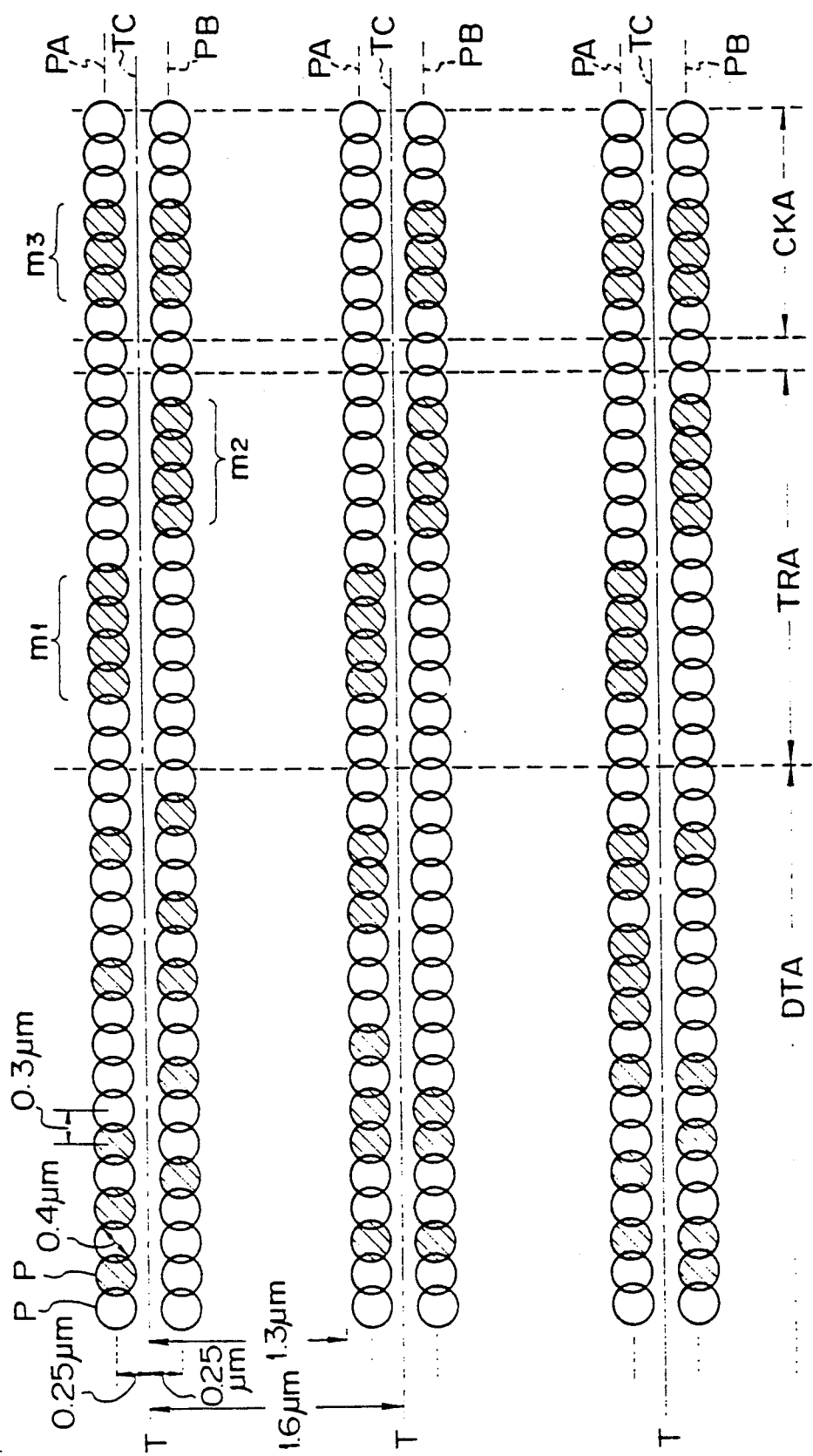
FIG. 6 is a schematic diagram which is used to explain an embodiment of the invention.

FIG. 6 shows a practical example of tracks T which are arranged on the optical disc 1. The tracks T are formed spirally or like rings onto the optical disc 1. Each track T comprises two pit trains PA and PB. The pit trains PA and PB are arranged so as to be away from each other by, for instance, every 0.25 μm in the opposite directions from the track center TC as a center. A diameter of each of the pits P which are arranged in each of the pit trains PA and PB is set to e.g., 0.4 μm and a channel clock width is set to, e.g., 0.3 μm. The pit diameter of 0.4 μm is slightly smaller than the pit diameter of 0.6 μm of the CD (compact disc), while the channel clock width of 0.3 μm is almost equal to the channel clock width of the CD. Therefore, the above pits P can be easily realized by the present working technique.

A track pitch between the tracks T is set to, e.g., 1.6 μm. Now, assuming that a separation width between the channels is equal to 0.5 μm, each pit on the adjacent tracks is away from the track center by 1.35 μm, so that the crosstalks between the tracks can be sufficiently suppressed.

A data recording area DTA is provided for each tracks T. A tracking area TRA and a clock area CKA are provided every predetermined interval.

An area m1 in which "1" continues in the pit train PA and "0" continues in the pit train PB and an area m2 in which "1" continues in the pit train PB and "0" continues in the pit train PA are provided for the tracking area TRA. A tracking control can be performed by comparing the reproduction signal of the area m and the reproduction signal of the area m2.

An area m3 in which "1" continues in both of the pit trains PA and PB is provided for the clock area CKA. Clocks are reproduced from the reproduction signal of the area m3 by a PLL.

In FIG. 1, data is recorded on the optical disc 1 as shown in FIG. 6. The optical disc 1 is rotated by a spindle motor 2.

A laser beam from a laser diode 3 is converted to a parallel light beam through a collimating lens 4 and is irradiated onto the optical disc 1 through a beam splitter 5 and an objective lens 6. A spot diameter of laser beam which is irradiated to the optical disc 1 is set to, e.g., 1.0 μm. The reflected lights from the optical disc 1 are given to the 4divided photodetector 8 through the objective lens 6, beam splitter 5, and a lens 7.

Four photodiodes 8A, 8B, 8C, and 8D are arranged in the 4-divided photodetector 8. Outputs of the photodiodes 8A to 8D are supplied to the matrix circuit 10 through reproducing amplifiers 9A, 9B, 9C, and 9D, respectively.

An arithmetic operating circuit to execute arithmetic operations as shown in the above equations (1) to (3) is provided for the matrix circuit 10. Three-dimensional signals X, Y, and Z are formed by the matrix circuit 10.

The three-dimensional signals X, Y, and Z from the matrix circuit 10 are supplied to an AGC and bias eliminating circuit 11, respectively. The circuit 11 executes an AGC (automatic gain control) and eliminates a DC offset amount in association with a tracking error or the like. Outputs of the circuit 11 are supplied to a three-dimensional decoder 12.

The Z signal from the matrix circuit 10 is supplied to a PLL and timing generator 13. The PLL and timing generator 13 reproduces clocks on the basis of a reproduction signal from the clock area CKA. The reproduction clocks are generated from an output terminal 14 and supplied to the three-dimensional decoder 12 and a tracking signal detected circuit 15.

The X signal from the matrix circuit 10 is supplied to the tracking signal detecting circuit 15. The tracking signal detecting circuit 15 forms a tracking error signal by using the reproduction signal of the tracking area TRA. The tracking error signal is generated from an output terminal 16. The tracking control is performed by the sample servo system by using the tracking error signal.

Figure 7:
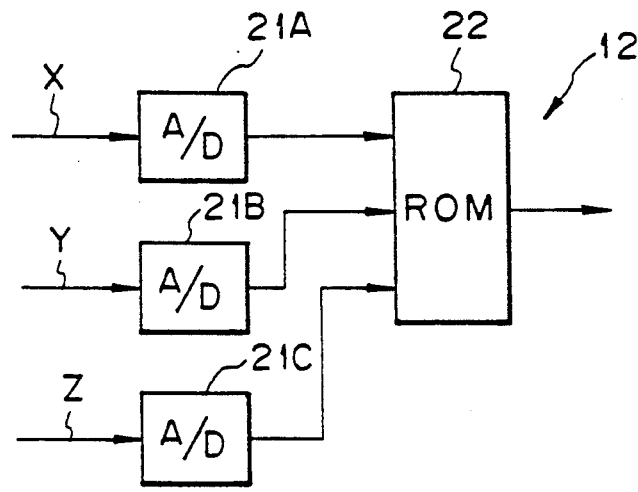
FIG. 7 is a block diagram which is used to explain a three-dimensional decoder in an embodiment of the invention.

The three-dimensional decoder 12 decodes the data from the three-dimensional signals X, Y, and Z transmitted through the AGC and bias eliminating circuit 11. The data decoded by the decoder 12 is taken out from an output terminal 17. As shown in FIG. 7, for instance, the decoder 12 can be constructed by A/D converters 21A, 21B, and 21C and an ROM 22. That is, all of tables of the decoding data corresponding to the possible three-dimensional signals are prepared in the ROM 22. The three-dimensional signals X, Y, and Z are converted into the digital signals by, for instance, five bits by the A/D converters 21A, 21B, and 21C. The three-dimensional signals X, Y, and Z are supplied to addresses in the ROM 22. With the above construction, the decoding data corresponding to the nearest 3-dimensional vector is directly generated from the ROM 22.

In the optical disc 1, it is now intended to accomplish the recording density which is twice as large as that of the conventional compact disc. To realize the double recording density of that of the compact disc for the optical disc 1, it is required to reproduce the information of two bits every 0.6 $\mu$m. This means that the reproduction data is generated every two bits from the 3-dimensional decoder 12 every two channel clocks.

To realize the above construction, when four kinds of vectors are expressed by using four pits existing at the center of the beam, it is sufficient that the four kinds of vectors are always sufficiently away from each other on the three-dimensional decoder. However, interferences among codes from four pits locating in the portions before and after the beam spot cannot be also ignored.

Therefore, with respect to the interference between the codes from the forward two pits, it is assumed that it is known which pattern has been recorded in the encoding operation. With regard to the backward two pits, the interference between the codes is considered as a part of noises. Four kinds of vectors in which the distance is the largest are searched on the basis of the above conditions.

Figure 8:
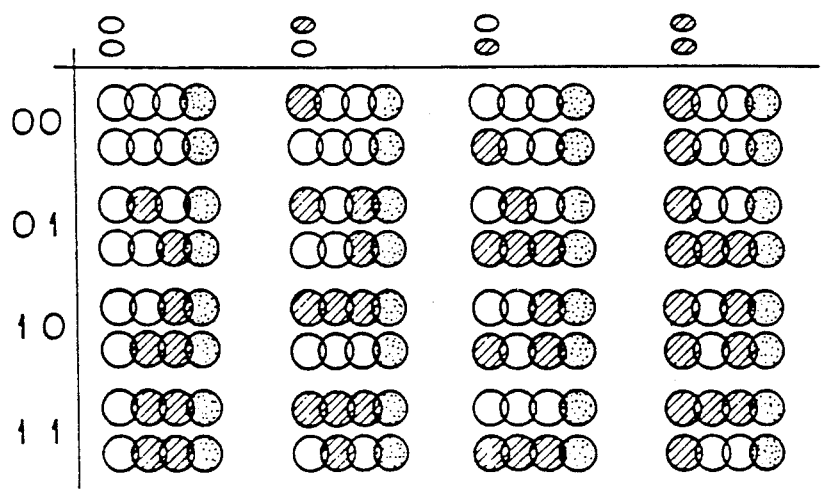
FIG. 8 is a schematic diagram which is used to explain an embodiment of the invention.

FIG. 8 shows examples of such patterns. In the examples, the codes whose minimum distance is equal to up to 7.9 are shown. Since each axis is quantized by five bits (32 values), the minimum distance of 7.9 corresponds to about ¼ of the distance from the peak of the signal to the next peak. Therefore, in such a distance, the decoding can be sufficiently performed.

According to the invention, pits each having a diameter smaller than the beam spot of the laser beam are arranged on the optical disc. The reflected lights from a plurality of pits on the optical disc are supplied to the four-divided photodetector. Outputs of the four-divided photodetector are supplied to the matrix circuit. The three-dimensional signals X, Y, and Z are formed from the outputs of the four-divided photodetector by the matrix circuit. The data recorded on the optical disc is decoded from the three-dimensional signals X, Y, and Z. On the other hand, according to the conventional optical disc reproducing apparatus of the bit-by-bit method, only the Z signal is used to reproduce the data. According to the invention, therefore, a recording density can be improved as compared with the conventional optical disc.

The tracking area TRA and clock area CKA are provided every predetermined interval on the optical disc to which the invention can be applied. The tracking control can be easily performed by using the reproduction signal of the tracking area TRA. On the other hand, the clocks can be easily reproduced by using the reproduction data of the clock area CKA.

According to the above embodiment, two pit trains are arranged on one track. However, two or more pit trains can be also arranged on one track in principle. The number of pit trains which can be arranged on one track depends on the beam spot of the laser beam and the working technique of the pits. According to the embodiment of the invention, although the three-dimensional vectors are formed by using the outputs of the 4-divided photodetector and the data is reproduced, it is also possible to form further multidimensional vectors by using four- or more-divided photodetector and to reproduce the data in principle.

Having described a specific preferred embodiment of the present invention with reference to the accompanying drawings, it is to be understood that the invention is not limited to that precise embodiment, and that various changes and modifications may be effected therein by one skilled in the art without departing from the scope or the spirit of the invention as defined in the appended claims.

What is claimed is:

1. An optical disc having tracks comprising a plurality of pit trains having a number of pits, each of said pits having a diamter smaller than a beam spot diamter of a laser beam; wherein said pit trains are arranged in a pit pattern such that multidimensional vectors representing detected signals are created.

2. An optical disc according to claim 1 further comprising a first area between said plurality of pit trains for tracking and a second area consisting of a plurality of pits for decoded timing.

3. An optical disc having tracks comprising at least two pit trains having a number of pits, each of said pits having a diameter smaller than a beam spot diameter of a laser beam; wherein said pit trains are arranged in a pit pattern such that three-dimensional vectors representing detected signals are created.

4. An optical disc according to claim 3 further comprising a first area between said plurality of pit trains for tracking and a second area consisting of a plurality pits for decoded timing.

5. An optical disc reproducing apparatus comprising:
    means for irradiating a laser beam onto an optical disc on which pits each having a diameter smaller than a beam spot diameter of a laser beam are arranged;
    means for forming multidimensional signals from reflected lights of the laser beam; and
    means for decoding recording data on the optical disc from multidimensional vectors which are obtained from the multidimensional signals.

6. An apparatus according to claim 5, wherein the means for forming the multidimensional signals comprises photodetecting means for divisionally detecting the reflected lights of the laser beam and arithmetic operating means for matrix operating outputs of said photodetecting means.

7. An apparatus according to claim 5, wherein said decoding means is a table in which the multidimensional vectors and the data are made correspond,
    multidimensional vectors which are away from each other by enough distances are selected as said multidimensional vectors corresponding to the data, and in the case where the inputted multidimensional vectors are other than the selected multidimensional vectors, the data corresponding to one of the selected multidimensional vectors which is close to said multidimensional vectors is generated.

8. An optical disc reproducing apparatus comprising:
   means for irradiating a laser beam onto an optical disc on which pits each having a diameter smaller than a beam spot diameter of a laser beam are arranged;
   means for forming multidimensional signals from reflected lights of the laser beam; and
   means for decoding recording data on the optical disc from three-dimensional vectors which are obtained from the multidimensional signals.

9. An apparatus according to claim 8, wherein the means for forming the three-dimensional signals comprises 4-divided photodetecting means for dividing the reflected lights of the laser beam into four portions and matrix operating means for matrix operating outputs of said photodetecting means and forming three-dimensional signals of a primary diffracted light in the radial direction a primary diffracted light in the tangential direction, and a 0th-order diffracted light.

10. An apparatus according to claim 8, wherein said decoding means is a table in which three-dimensional vectors and data are made correspond,
    three-dimensional vectors which are away from each other by enough distances are selected as said three-dimensional vectors corresponding to the data, and
    when the inputted three-dimensional vectors are other than said selected three-dimensional vectors, the data corresponding to one of the selected three-dimensional vectors which is close to said three-dimensional vectors is generated.

11. An optical disc reproducing apparatus comprising:
    means for irradiating a laser beam onto an optical disc on which pits each having a diameter smaller than a beam spot diameter of a laser beam are arranged;
    means for forming multidimensional signals from reflected lights of the laser beam;
    means for decoding recording data on the optical disc from multidirectional vectors which are obtained from said multidimensional signals;
    means for executing a tracking control by using a signal which is reproduced from a predetermined area on the optical disc; and
    means for setting a decoding timing by using the signal which is reproduced from the predetermined area on the optical disc.

12. An apparatus according to claim 11, wherein the means for forming the multidimensional signals comprises photodetecting means for dividing the reflected lights of the laser beam and arithmetic operating means for matrix operating outputs of the photodetecting means.

13. An apparatus according to claim 11, wherein the decoding means is a table in which the multidimensional vectors and the data are made correspond,
    multidimensional vectors which are away from each other by enough distances are selected as said multidimensional vectors corresponding to the data, and
    when inputted multidimensional vectors are other than said selected multidimensional vectors, the data corresponding to one of the selected multidimensional vectors which is close to said multidimensional vectors is generated.

14. An optical disc reproducing apparatus comprising:
    means for irradiating a laser beam onto an optical disc on which pits each having a diameter smaller than a beam spot diameter of a laser beam are arranged;
    means for forming three-dimensional signals from reflected lights of the laser beam;
    means for decoding recording data on the optical disc from three-dimensional vectors which are obtained from said three-dimensional signals;
    means for executing a tracking control by using a signal which is reproduced from a predetermined area on the optical disc; and
    means for setting a decoding timing by using the signal which is reproduced from the predetermined area on the optical disc.

15. An apparatus according to claim 14, wherein the means for forming the three-dimensional signals comprises 4-divided photodetecting means for dividing the reflected lights of the laser beam into four portions and matrix arithmetic operating means for matrix operating outputs of said photodetecting means and forming the three-dimensional signals of a primary diffracted light in the radial direction a primary diffracted light in the tangential direction, and a 0th-order diffracted light.

16. An apparatus according to claim 14, wherein the decoding means is a table in which the three-dimensional vectors and the data are made correspond,
    three-dimensional vectors which are away from each other by enough distances are selected as said three-dimensional vectors corresponding to the data, and
    when inputted three-dimensional vectors are other than the selected three-dimensional vectors, the data corresponding to one of the selected three-dimensional vectors which is close to said three-dimensional vectors is generated.

* * * * *